United States Patent
Hognaland

(10) Patent No.: US 10,474,140 B2
(45) Date of Patent: Nov. 12, 2019

(54) ROBOT FOR TRANSPORTING STORAGE BINS

(71) Applicant: Autostore Technology AS, Nedre Vats (NO)

(72) Inventor: Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 15/546,851

(22) PCT Filed: Jan. 14, 2016

(86) PCT No.: PCT/EP2016/050591
§ 371 (c)(1),
(2) Date: Jul. 27, 2017

(87) PCT Pub. No.: WO2016/120075
PCT Pub. Date: Aug. 4, 2016

(65) Prior Publication Data
US 2017/0355524 A1   Dec. 14, 2017

(30) Foreign Application Priority Data

Jan. 28, 2015   (EP) .................................... 15152835

(51) Int. Cl.
*B66F 9/06* (2006.01)
*H02K 41/03* (2006.01)
(Continued)

(52) U.S. Cl.
CPC ...... *G05B 19/41895* (2013.01); *B60K 7/0007* (2013.01); *B65G 1/0464* (2013.01); *B65G 1/0478* (2013.01); *B66F 9/06* (2013.01); *B66F 9/063* (2013.01); *H02K 1/27* (2013.01); *H02K 35/02* (2013.01); *H02K 41/031* (2013.01);
(Continued)

(58) Field of Classification Search
CPC .......................... G05B 19/41895; H02K 1/27
See application file for complete search history.

(56) References Cited

U.S. PATENT DOCUMENTS

| 5,180,344 A | 1/1993 | Hall |
| 2004/0211606 A1* | 10/2004 | Prucher ................ B60K 7/0007 180/65.51 |

(Continued)

FOREIGN PATENT DOCUMENTS

| EP | 2562072 A1 | 2/2013 |
| NO | 317366 B1 | 10/2004 |

(Continued)

OTHER PUBLICATIONS

Office Action issued in counterpart European Patent Application No. 15152835.3, dated Jul. 21, 2017 (7 pages).

(Continued)

*Primary Examiner* — Thomas Randazzo
(74) *Attorney, Agent, or Firm* — Osha Liang LLP

(57) ABSTRACT

A remotely operated vehicle suitable for picking up storage bins from an underlying storage system. The vehicle includes driving means situated at or at least partly within rolling means of the vehicle, providing rolling set specific driving force to the vehicle in either the first direction or the second direction.

15 Claims, 9 Drawing Sheets

(51) Int. Cl.
*G05B 19/418* (2006.01)
*H02K 35/02* (2006.01)
*H02K 1/27* (2006.01)
*H02P 5/00* (2016.01)
*B60K 7/00* (2006.01)
*B65G 1/04* (2006.01)

(52) U.S. Cl.
CPC ........ *H02P 5/00* (2013.01); *B60K 2007/0038* (2013.01); *B60K 2007/0092* (2013.01)

(56) References Cited

U.S. PATENT DOCUMENTS

| | | | | |
|---|---|---|---|---|
| 2005/0225275 | A1* | 10/2005 | Eskritt | B62D 5/065 318/437 |
| 2008/0289309 | A1* | 11/2008 | Gust | A01D 69/00 56/11.9 |
| 2010/0301712 | A1* | 12/2010 | Amutham | H02K 7/088 310/68 B |
| 2011/0259658 | A1 | 10/2011 | Huang et al. | |
| 2012/0215389 | A1* | 8/2012 | Perry | B60K 6/48 701/22 |
| 2013/0049549 | A1* | 2/2013 | Folmli | B62M 6/65 310/67 A |
| 2013/0099554 | A1 | 4/2013 | Lee | |
| 2013/0307450 | A1 | 11/2013 | Fuller et al. | |
| 2014/0015382 | A1* | 1/2014 | Kim | H02K 7/14 310/67 R |
| 2014/0035347 | A1 | 2/2014 | Zanfei et al. | |
| 2014/0113828 | A1* | 4/2014 | Gilbert | G01R 33/0354 505/100 |
| 2014/0148985 | A1* | 5/2014 | Sato | B60W 20/00 701/22 |
| 2014/0191624 | A1* | 7/2014 | Jahshan | H02K 35/02 310/68 B |
| 2015/0375388 | A1* | 12/2015 | Ullrich | B25F 5/02 173/170 |

FOREIGN PATENT DOCUMENTS

| | | |
|---|---|---|
| WO | 98/49075 A1 | 11/1998 |
| WO | 2005077789 A1 | 8/2005 |
| WO | 2014/090684 A1 | 6/2014 |
| WO | WO-2014090684 A1 * | 6/2014 .......... B65G 1/0464 |
| WO | 2014/203126 A1 | 12/2014 |
| WO | 2014/205523 A2 | 12/2014 |
| WO | WO-2014205523 A2 * | 12/2014 ............... H02K 1/20 |

OTHER PUBLICATIONS

International Search Report issued in corresponding application No. PCT/EP2016/050591 dated Mar. 21, 2016 (3 pages).
Written Opinion of the International Searching Authority issued in corresponding application No. PCT/EP2016/050591 dated Mar. 21, 2016 (7 pages).
International Preliminary Report on Patentability issued in corresponding application No. PCT/EP2016/050591 dated Jan. 13, 2017 (14 pages).
Parker-Hannifin Corporation: "Parker-Hannifin Corporation", Netwise Manufactuing Industry Company Reports, Jan. 1, 2011 (Jan. 1, 2011), XP055545417, Boca Raton, Retrieved from the Internet: URL: http://www.exoticautomation.com/wp-content/uploads/2017/01/Parker-Gearhead-and-Gearmotors-Catalog.pdf [retrieved on Jan. 21, 2019] (76 pages).
Extended European Search Report issued in European Application No. 18200022.4, dated Jan. 29, 2019 (12 pages).
Office Action issued in corresponding U.S. Appl. No. 16/171,024, dated Apr. 30, 2019 (28 pages).

* cited by examiner

ROBOT FOR TRANSPORTING STORAGE BINS

TECHNICAL FIELD

One or more embodiments of the present invention relate to a remotely operated vehicle, or robot, for picking up storage bins from a storage system and a storage system for storage of bins.

BACKGROUND

A remotely operated vehicle for picking up storage bins from a storage system is known. A detailed description of a relevant prior art storage system is presented in WO 98/49075, and details of a prior art vehicle being suitable for such a storage system is disclosed in detail in Norwegian patent NO317366. Such prior art storage systems comprise a three dimensional storage grid containing storage bins that are stacked on top of each other up to a certain height. The storage grid is normally constructed as aluminium columns interconnected by top rails, onto which a plurality of remotely operated vehicles, or robots, are arranged to move laterally. Each vehicle is equipped with a lift for picking up, carrying, and placing bins that are stored in the storage grid, and a rechargeable battery in order to supply electrical power to a vehicle incorporated motor. The vehicle typically communicates with a control system via a wireless link and is recharged at a charging station when needed, typically at night.

An example of a prior art storage system is illustrated in FIG. 1. The storage system 3 includes a plurality of vehicles or robots 1 configured to move in X and Y directions (see Cartesian coordinate system 100) on dedicated supporting rails 13, and to receive a storage bin 2 from a storage column within a bin storing grid 15. The prior art storage system 3 may also include a dedicated bin lift device 50, the latter being arranged to receive a storage bin 2 from a vehicle 1 at the top level of the storage system 3 and to convey the storage bin 2 down in a vertical direction to a delivery station, or port 60.

However, with this known system each vehicle is covering a cross section of the underlying storage system that corresponds to two storage columns, thereby limiting the maximum number of simultaneously operating vehicles.

One or more embodiments of the present invention may provide a vehicle and a storage system that allows a significant increase in the number of simultaneously operating vehicles during successful handling of storage bins.

SUMMARY

One or more embodiments of the present invention are set forth and characterized in the main claim, while the dependent claims describe other characteristics of the invention.

In particular, one or more embodiments of the invention concern a remotely operated vehicle suitable for picking up storage bins from an underlying storage system, comprising a vehicle lifting device suitable for lifting the storage bin from the underlying storage system, a first vehicle rolling means comprising a first rolling set and a second rolling set arranged at opposite facing side walls of a vehicle body, allowing movement of the vehicle along a first direction (X) on the underlying storage system during use, and a second vehicle rolling means comprising a first rolling set and a second rolling set arranged at opposite facing side walls of the vehicle body, allowing movement of the vehicle along a second direction (Y) on the underlying storage system during use, the second direction (Y) being perpendicular to the first direction (X), and wherein each of said rolling sets comprises at least two wheels. The first and second rolling sets may also include belts, chain tracks or any other mechanisms or combination of mechanisms that enables movement of the vehicle forward and/or backwards on the underlying storage system.

The vehicle further comprises a first driving means situated at or at least partly within the first vehicle rolling means and being suitable for providing rolling set specific driving force to the vehicle in the first direction (X), a second driving means situated at or at least partly within the second vehicle rolling means and being suitable for providing rolling set specific driving force to the vehicle in the second direction (Y) and motor control electronics arranged within the volume between two of the wheels of each rolling set, which motor control electronics are configured to supply electric power to the first and second vehicle rolling means. During use, at least one of the first and second vehicle rolling means are in contact with the underlying storage system.

In an advantageous embodiment at least one of the driving means comprises an electric motor using permanent magnets such as a brushless electric DC (direct current) motor.

In another advantageous embodiment at least one of the first and second driving means comprises rotor magnets arranged at the inner surface of the outer periphery of their/its respective vehicle rolling means.

In another advantageous embodiment the at least one of the first driving means and the second driving means comprises a stator arranged at least partly, possibly fully, within the same rotational plane as the vehicle rolling means and at least partly, possibly fully, within the vehicle body. Rotational plane signifies in this embodiment the plane extending perpendicular from the rotational axis of the vehicle rolling means.

In another advantageous embodiment the vehicle comprises means suitable for measuring (at least indirectly) electromotive force (emf) of at least one of the vehicle rolling means, the means being in signal communication with one of the stator and the rotor, thereby allowing rolling set specific velocity registration of the vehicle during operation. For example, a back-emf measurement circuit may be installed in signal communication with the vehicle rolling means. A hall sensor may be used as an alternative or in combination.

In another advantageous embodiment the vehicle comprises a rotary encoder (at least indirectly) connected to at least one of the first and second vehicle rolling means, thereby allowing angular position feedback during operation. Such rotary encoders is suitable for conversion of the angular motion of the vehicle rolling means to an analog or digital code. The rotary encoders (or shaft decoders) may be of type absolute rotary encoder and/or absolute multi-turn encoder. Said absolute rotary encoder may be at least one of a mechanical encoder, an optical encoder, a magnetic encoder and a capacitive encoder. Furthermore, the absolute multi-turn encoder may be at least one of a battery-powered multi-turn encoder, a geared multi-turn encoder, and a self-powered multi-turn encoder.

In another advantageous embodiment the rotary encoder is a rotary encoder disk arranged within the outer periphery of the at least one of the first and second vehicle rolling means, preferably possibly between the outer periphery and the rotor magnets.

In another advantageous embodiment the vehicle further comprises means suitable for measuring acceleration of at least one of the first and second vehicle rolling means, them means being in signal communication with the stator. Such a means may comprise one or more piezoelectric sensors, for example an accelerometer from PCB™ Piezotronics. One or more inductive sensors may be used as an alternative to piezoelectric sensor(s), or in combination with piezoelectric sensor(s).

In another advantageous embodiment each rolling sets comprises at least two wheels, and the vehicle further comprises motor control electronics arranged within the volume between two of the wheels of each rolling set. Said motor control electronics are in this embodiment configured to supply electric power to the first and second vehicle rolling means, and may also transmit communication signals.

In another advantageous embodiment the first vehicle rolling means comprises four X-wheels having their direction of revolution in the first direction and the second vehicle rolling means comprises four Y-wheels having their direction of revolution in the second direction, wherein each of the X-wheels and each of the Y-wheels is drivingly connected to the first driving means and the second driving means, respectively. Each of the wheels may comprise a plurality of rotor magnets (for example in the form of a rotor magnet disc) arranged within the inner surface of the wheels outer periphery and a plurality of stators (for example in the form of a stator disc) arranged at least partly, for example fully, within the vehicle body, possibly at the same or nearly the same height has the location of the wheels rotational axis. The height is in this document referring to the distance from the topmost point of the underlying storage system during use. Said stators include both windings and yoke, and the stator field windings are following the outer periphery of the wheels.

In another advantageous embodiment at least part of, and possibly all of, the driving means is arranged within the wheels outer periphery.

For example, when four belts are applied in order to drive the inventive vehicle in the X and Y-directions, a total of four motors may be installed in operative engagement with each of the four belts, thereby achieving the desired rolling set specific driving force. Likewise, when eight wheels are applied in order to drive the vehicle in the X- and Y-directions, a total of eight motors may be installed in operative engagement with each of the eight wheels, thereby achieving the desired rolling set specific driving force.

One or more embodiments of the invention also may concern a storage system suitable for storage of bins. The storage system comprises a bin storing structure comprising a plurality of storage columns, where each storage columns is arranged to accommodate a vertical stack of storage bins and a remotely operated vehicle in accordance with any of the above mentioned embodiments.

In the following description, specific details are introduced to provide a thorough understanding of embodiments of the claimed vehicle and storage system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

DETAILED DESCRIPTION

Figure 1:
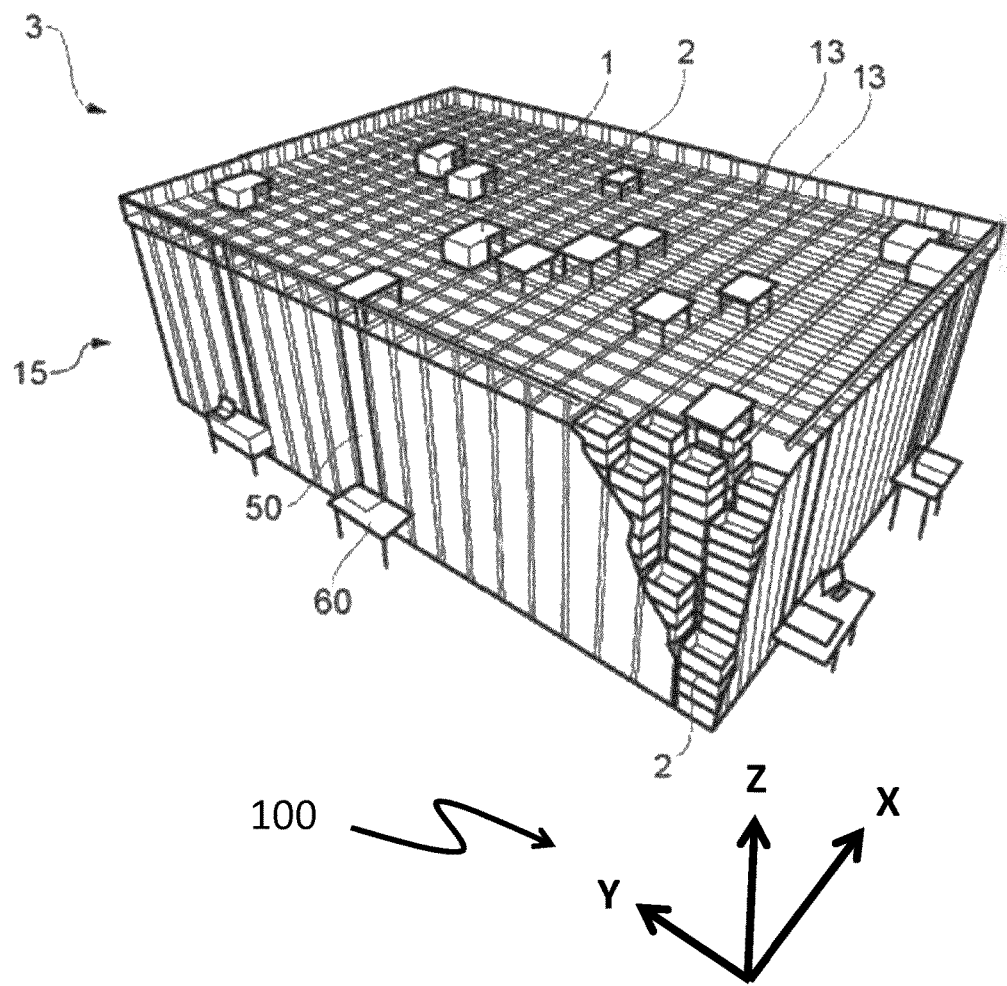
FIG. 1 is a perspective view of a prior art storage system comprising a grid and a plurality of remotely operated vehicles/robots.

All relative terms used to describe the inventive vehicle (hereinafter referred to as the robot) such as upper, lower, lateral, vertical, X-direction, Y-direction, Z-direction, etc, shall be interpreted using the above mentioned prior art storage system (FIG. 1) as reference system. For the sake of clarity the X, Y and Z-directions are illustrated by a Cartesian coordinate system 100 in FIGS. 1-7 and 9.

Figure 2:
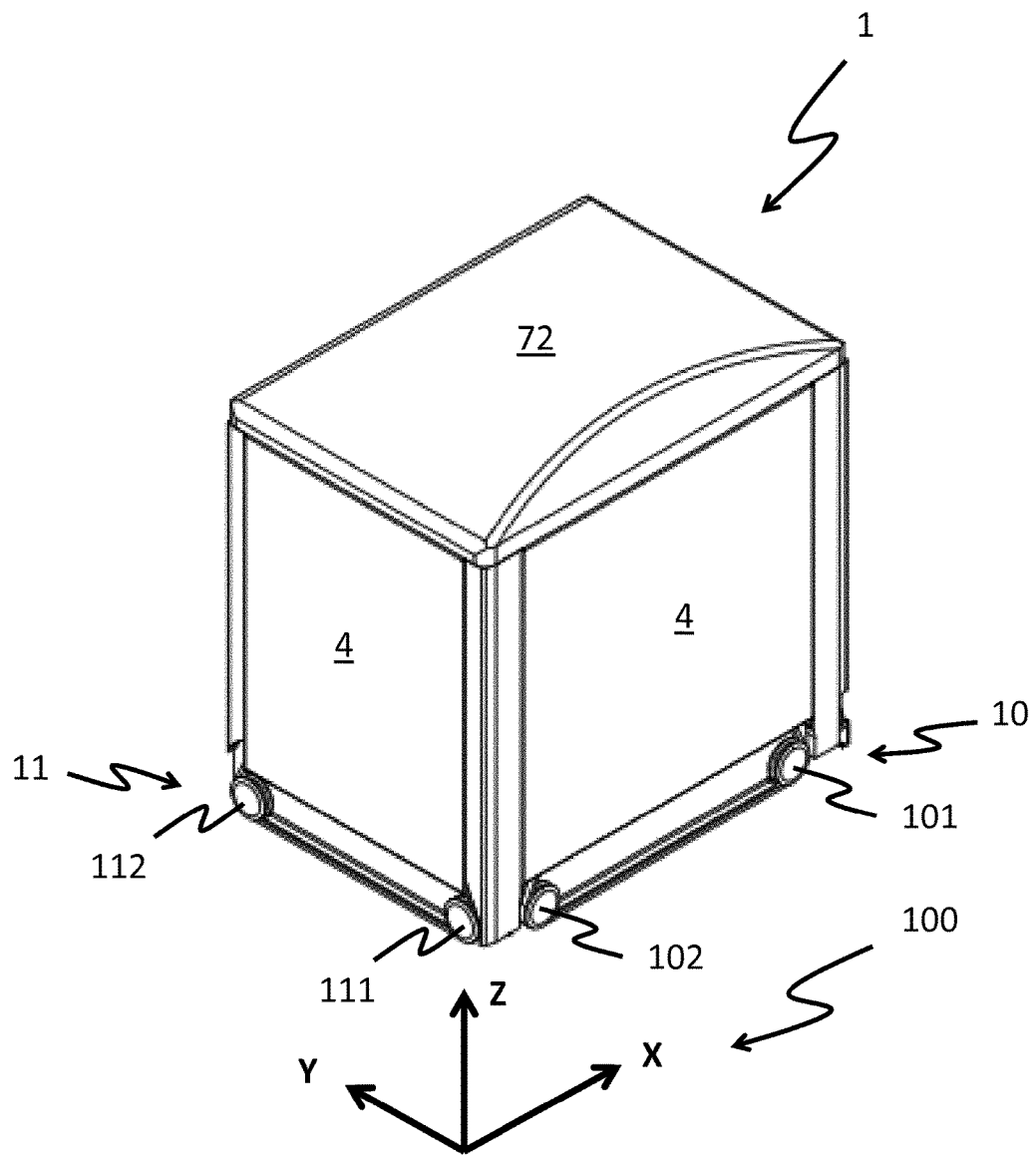
FIG. 2 is a perspective view seen from above of a remotely operated vehicle according to one or more embodiments of the invention.
Figure 3:
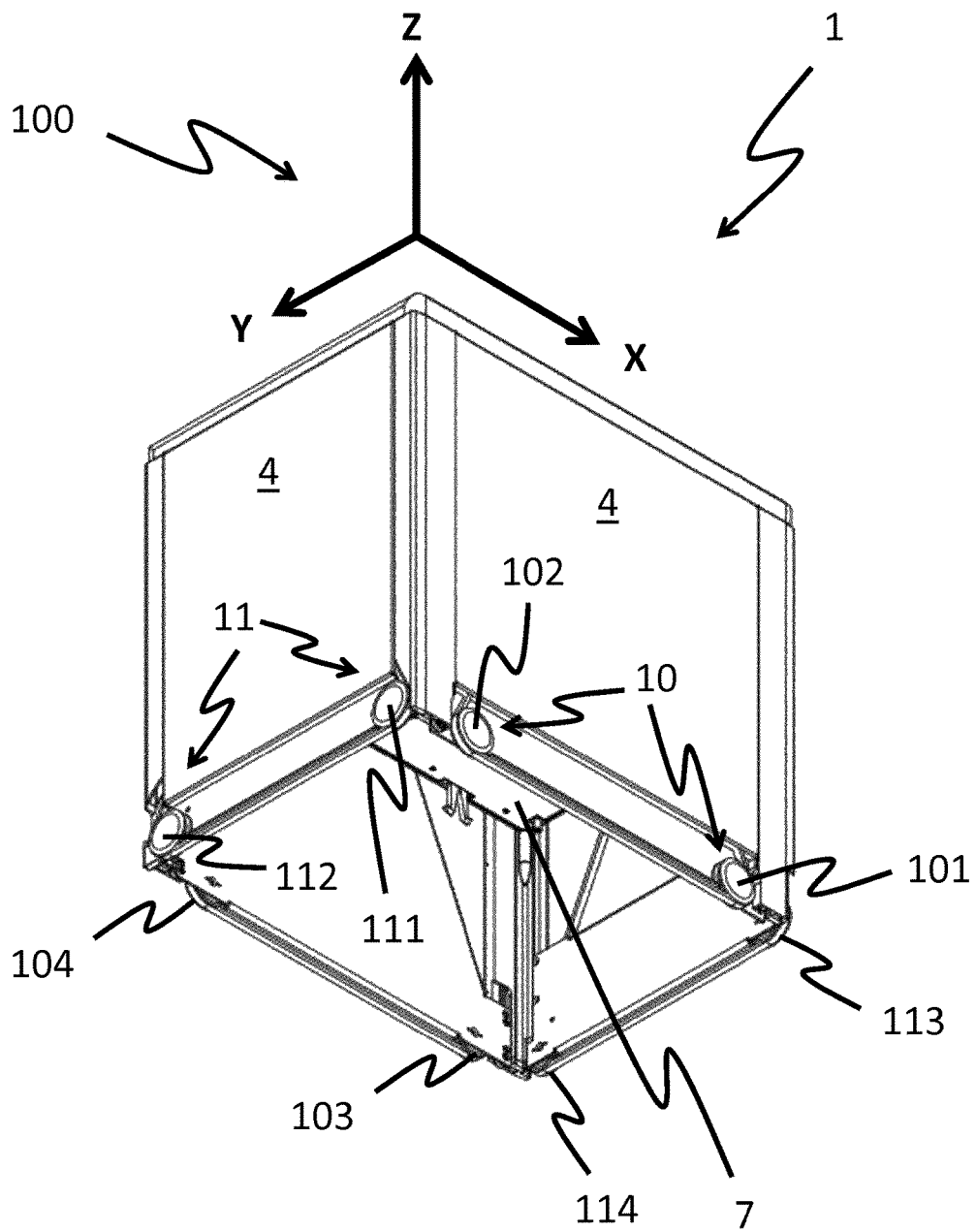
FIG. 3 is a perspective view of the vehicle in FIG. 2, seen from below.

FIGS. 2 and 3 give perspective views in two different angles of a robot 1 comprising a rectangular vehicle body or framework 4 displaying a cavity centrally arranged there within, a top lid 72 covering the top part of the body 4, a first vehicle rolling means 10 comprising four X-wheels 101-104 for movement in the X-direction on the supporting rails 13 of the underlying bin storing grid 15 and a second vehicle rolling means 11 comprising four Y-wheels for movement in the Y-direction on the supporting rails 13 of the underlying bin storing grid 15, in which both the first and second rolling means 10,11 are mounted at the exterior walls of the body 4. The size of the cavity within the robot 1 (FIG. 3) is adapted to contain at least the main part constituting the largest storage bin 2 intended to be picked up by the robot 1, possibly the entire bin. The operation of picking up storage bins 2 is performed by a lifting device 7 shown in a retracted position at the top end of the cavity of FIG. 3.

Figure 4:
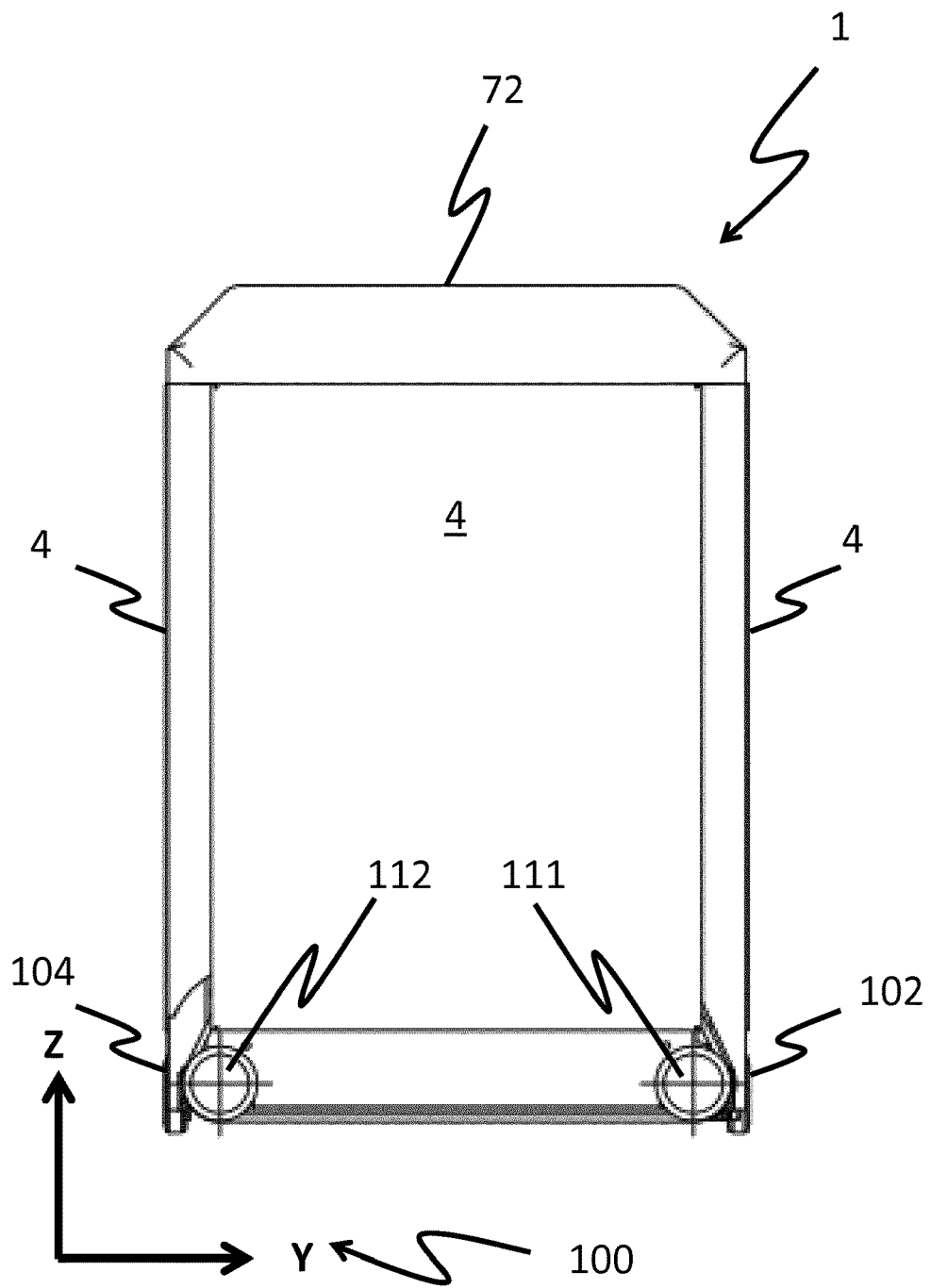
FIG. 4 is a cross-sectional view of the vehicle in FIGS. 2 and 3 seen along one principal orientation of the vehicle.

FIG. 4 shows a cross section of the robot 1 when observed along the X-direction.

Figure 5:
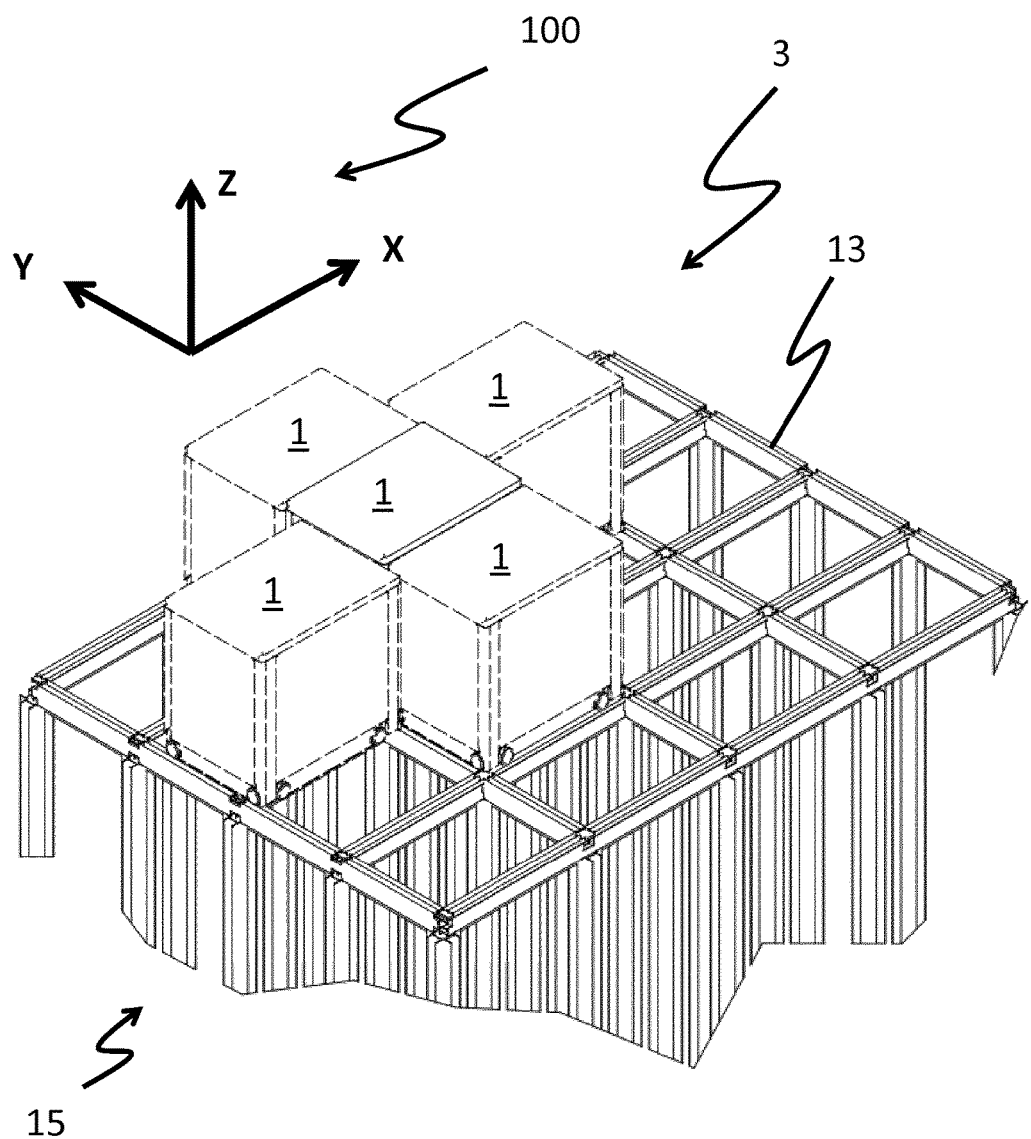
FIG. 5 is a perspective view of the storage system seen from above in accordance with one or more embodiments of the invention, where the inventive vehicles are shown arranged directly above five neighbouring storage columns.
Figure 6:
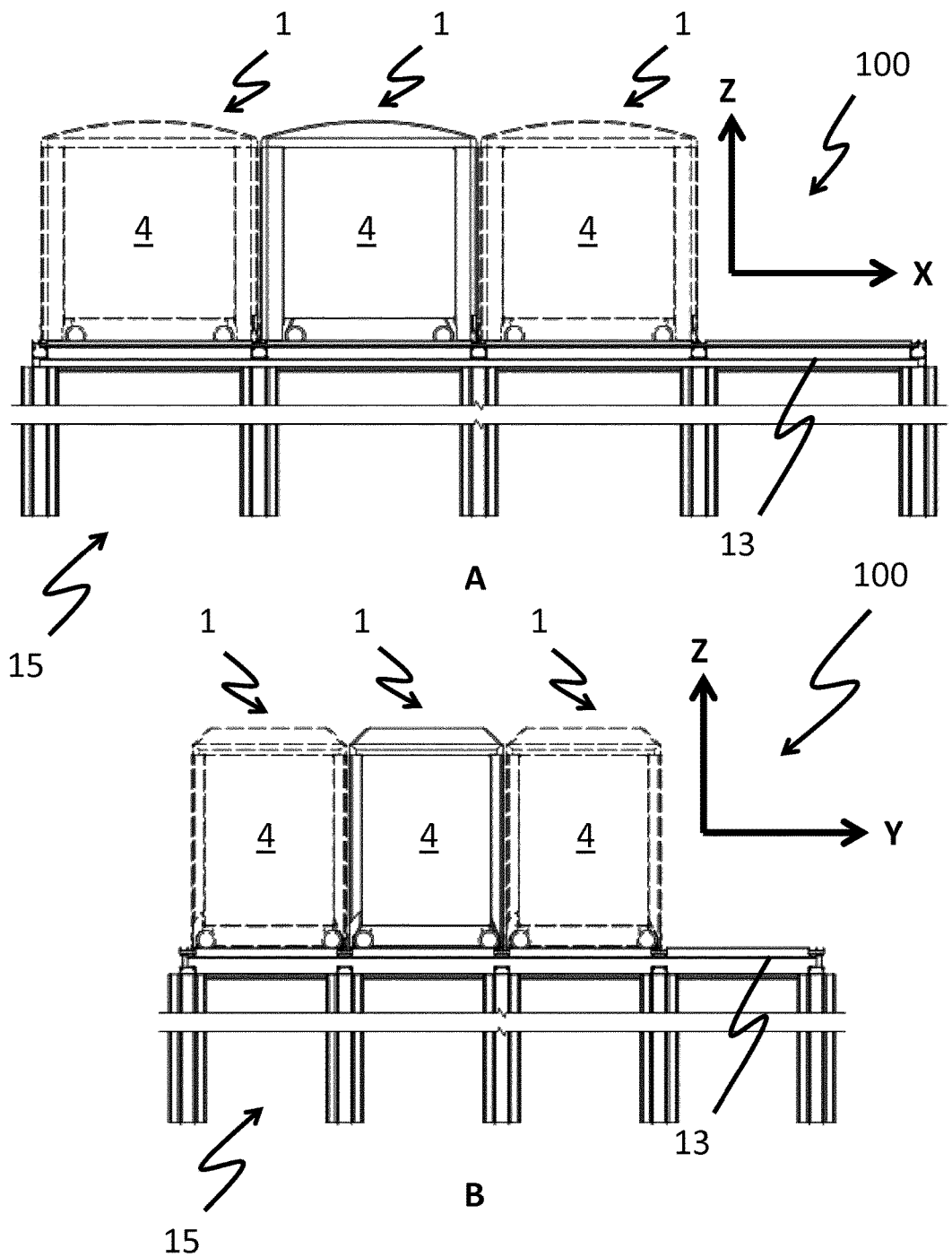
FIGS. 6 A and B are cross-sectional view of the storage system in FIG. 5 showing the inventive vehicles above neighbouring columns along the two principal orientations of the vehicles.

FIGS. 5 and 6 show part of the storage system 3 in which the robots 1 are arranged in various neighbouring positions on top of the bin storing grid 15. In four of the five positions, the robot 1 is arranged directly above the grid's 15 storage columns. As most apparent in FIGS. 6 A and B, which shows the storage system 3 of FIG. 5 in a cross-sectional view along Y-direction and X-direction, respectively, the robots 1 are dimensioned so that the maximum cross sectional area along the X-Y plane occupies not more than the cross sectional area of the corresponding (underlying) storage column. Hence, two or more robots 1 may be operated simultaneously above neighbouring columns of the grid 15, liberating more space compared to prior art systems.

Figure 7:
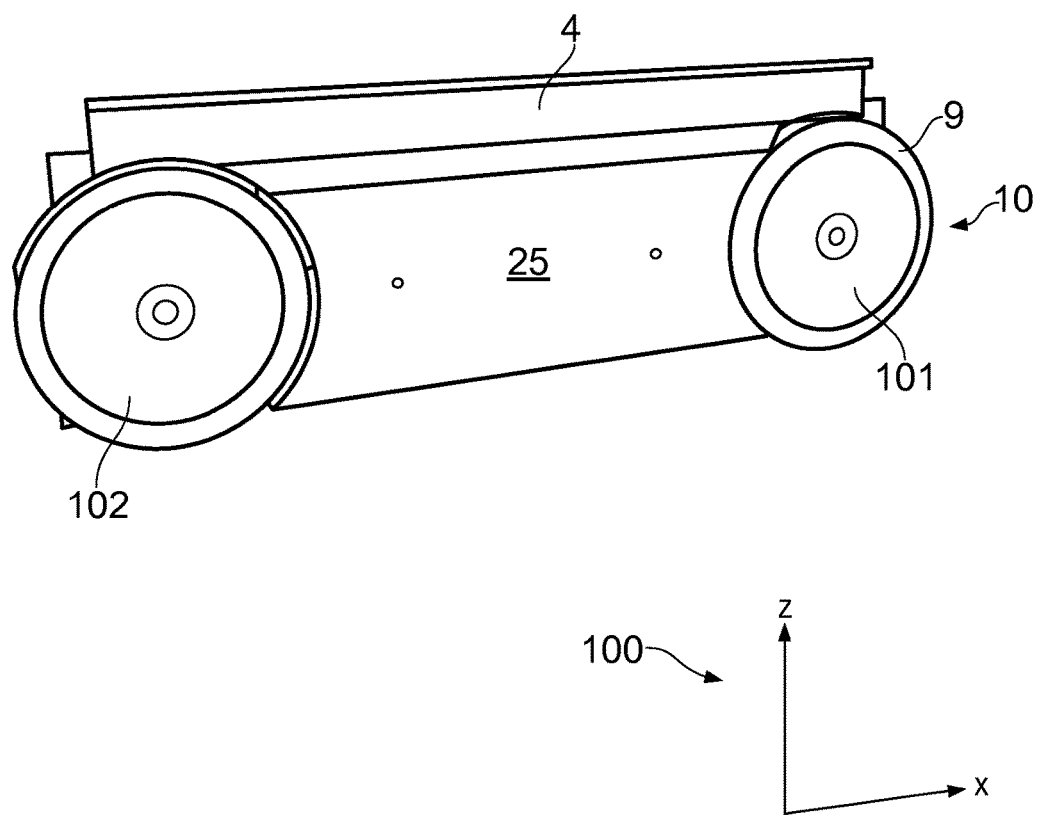
FIG. 7 is a perspective view of a rolling set constituting part of the vehicle in accordance with one or more embodiments of the invention.

One side of the first vehicle rolling means 10 is illustrated in FIG. 7 in a perspective side view. The rolling means 10 comprises in this particular embodiment of the invention two wheels 101,102 with outer rims/edges 9 situated near the corners of the vehicle body 4 along the X-direction. A cover plate 25 constituting part of the vehicle body 4 is arranged between the two wheels 101,102.

Figure 8:
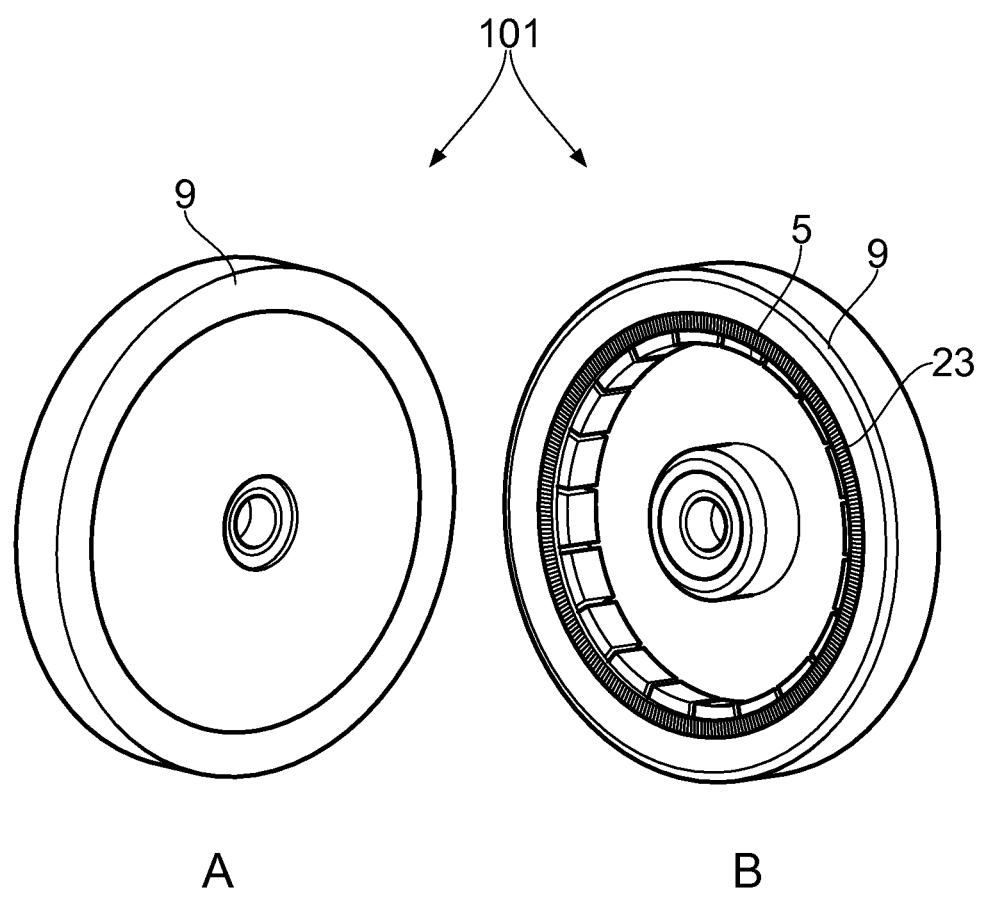
FIGS. 8 A and B are perspective views of a wheel constituting part of the vehicle in accordance with one or more embodiments of the invention.

Further details of one of these wheels 101,102 are provided in FIGS. 8 A and B, showing the outer side and the inner side, respectively. In FIG. 8B a rotary encoder 23 of type optical rotary quadrature encoder has been arranged within the inner radial surface of the outer rim 9. Other types of encoders may be used such as magnetic encoders, linear encoders, voltage based analog encoders, etc. A rotor 5, in FIG. 8B shown as a set of permanent magnets 5, is arranged inside the circumference set up by the rotary encoder 23, i.e. closer to the rotational axis of the wheel 101.

Figure 9:
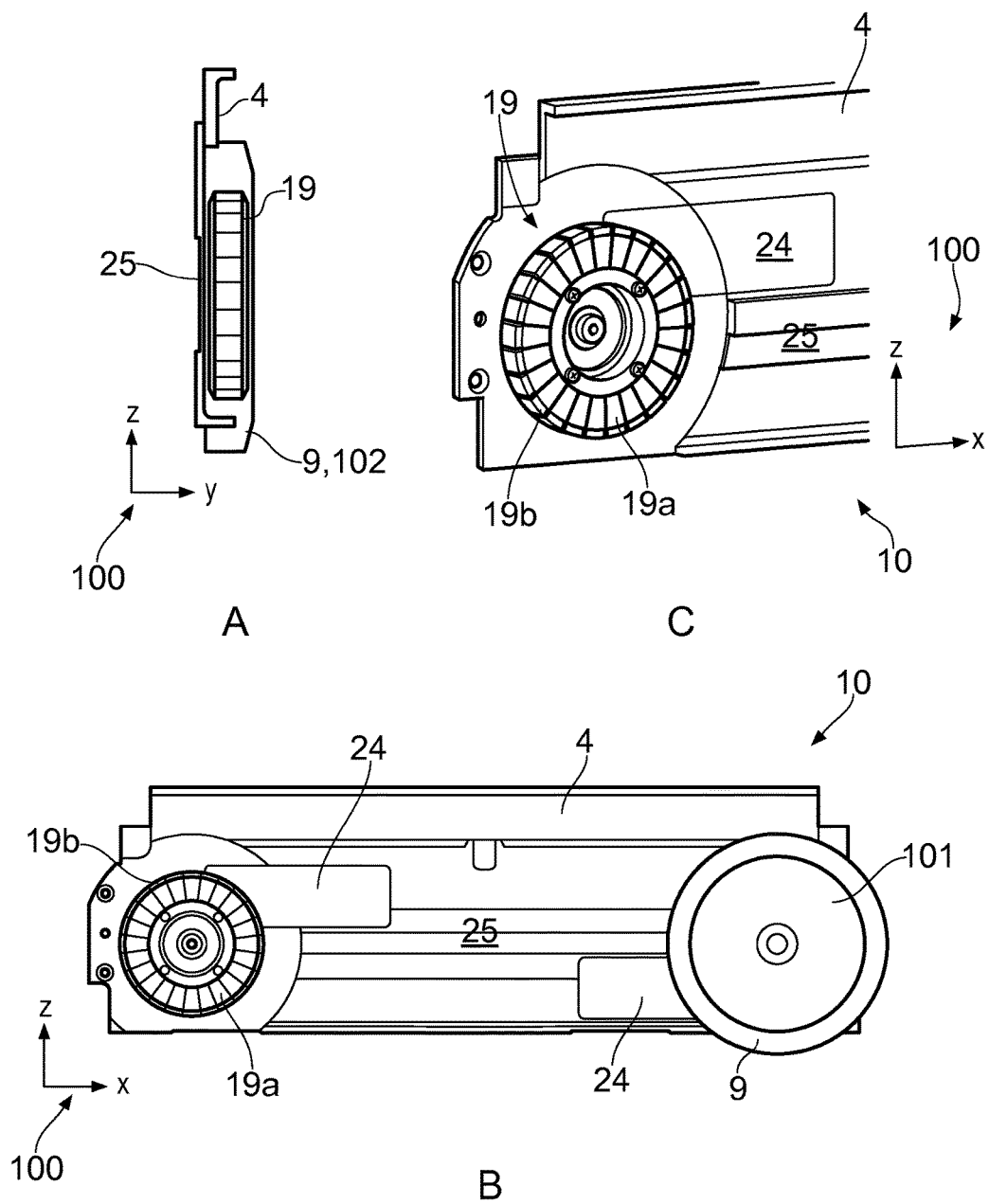
FIGS. 9 A, B and C illustrate the rolling set in FIG. 7 having one of the wheels removed, where FIGS. 9 A and B are cross-sectional views of the rolling set seen along each of the principal orientations of the vehicle and FIG. 9 C is a perspective side view of the part of the rolling set of which the wheel has been removed.

The corresponding stator 19 is seen in FIG. 9 in the form of electrical windings 19a wrapped around yokes 19b. However, a skilled person will understand that the stator 19 and rotor 5 may (in other embodiments of the invention) be configured with stator magnets and rotor yokes/windings, respectively.

FIGS. 9 B and C also illustrate an arrangement where means for measuring acceleration 24 is connected in signal communication with the stators 19 of each wheel 101,102, for example by use of piezoelectric sensors. FIG. 9 A is a cross section of part of the first vehicle rolling means 10 seen along the X-direction, illustrating stator 19 being enclosed by the outer rim 9.

All components and their interactions/configurations may be valid also for the second vehicle rolling means 11.

The fact that the driving means 5,19 are arranged near or within the rolling means 10,11 of the robot 1 contribute to liberate space on the storage system during operation, thereby allowing a more compact design of the robot 1 compared to prior art robots.

All operations of the robot 1 are controlled by wireless communication means and remote control units. This includes one or more of control of the robot movement, control of the vehicle lifting device 7, measurements of robot positions, measurements of robot velocities and measurements of robot accelerations.

In the preceding description, various aspects of the vehicle and the storage system according to one or more embodiments of the invention have been described with reference to illustrative embodiments. For purposes of explanation, systems and configurations were set forth in order to provide a thorough understanding of the system and its workings. However, this description is not intended to be construed in a limiting sense. Various modifications and variations of the illustrative embodiments, as well as other embodiments of the system, which are apparent to persons skilled in the art to which the disclosed subject matter pertains, are deemed to lie within the scope of the present invention.

LIST OF REFERENCE NUMERALS

1 Remotely operated vehicle/robot
2 Storage bin
3 Storage system
4 Vehicle body/framework
5 Rotor/permanent magnets
7 Lifting device
9 Outer rim/outer periphery of rolling means
10 First vehicle rolling means/first set of wheels
11 Second vehicle rolling means/second set of wheels
13 Supporting rail
15 Bin storing grid
19 Stator
19a Windings
19b Yoke
23 Rotary encoder
24 Means for measuring acceleration/piezoelectric sensor
25 Cover plate
50 Bin lift device
60 Delivery station/port
72 Top lid
100 Cartesian coordination system
101 First X-wheel
102 Second X-wheel
103 Third X-wheel
104 Fourth X-wheel
111 First Y-wheel
112 Second Y-wheel
113 Third Y-wheel
114 Fourth Y-wheel

The invention claimed is:

1. A remotely operated vehicle for picking up storage bins from an underlying storage system, comprising:
    a vehicle lifting device for lifting the storage bin from the underlying storage system,
    a first vehicle rolling means comprising a first rolling set and a second rolling set arranged at opposite facing side walls of a vehicle body, allowing movement of the vehicle along a first direction on the underlying storage system during use, and
    a second vehicle rolling means comprising a first rolling set and a second rolling set arranged at opposite facing side walls of the vehicle body, allowing movement of the vehicle along a second direction on the underlying storage system during use, the second direction being perpendicular to the first direction,
    wherein each of said rolling sets comprises at least two wheels,
    wherein the vehicle further comprises:
        a first driving means situated at or at least partly within the first vehicle rolling means for providing rolling set specific driving force to the vehicle in the first direction,
        a second driving means situated at or at least partly within the second vehicle rolling means for providing rolling set specific driving force to the vehicle in the second direction and
        motor control electronics arranged within the volume between two of the wheels of each rolling set, which motor control electronics are configured to supply electric power to the first and second vehicle rolling means.

2. The vehicle in accordance with claim 1, wherein at least one of the first and second driving means comprises rotor magnets arranged at the inner surface of the outer periphery of the vehicle rolling means.

3. The vehicle in accordance with claim 1, wherein at least one of the driving means comprises an electric motor using permanent magnets.

4. The vehicle in accordance with claim 3, wherein the at least one of the first driving means and the second driving means comprises a stator arranged at least partly within the same rotational plane as the vehicle rolling means and at least partly within the vehicle body.

5. The vehicle in accordance with claim 1, wherein
at least one of the first and second driving means comprises an electric motor comprising a rotor and a stator and that
the vehicle further comprises
means for measuring back electromotive force, the means being in signal communication with one of the stator and the rotor, allowing rolling set specific velocity registration of the vehicle during operation.

6. The vehicle in accordance with claim 1, wherein the vehicle comprises a rotary encoder connected to at least one of the first and second vehicle rolling means, allowing angular position feedback during operation.

7. The vehicle in accordance with claim 6, wherein the rotary encoder is of type optical encoders.

8. The vehicle in accordance with claim 6, wherein the rotary encoder is a rotary encoder disk arranged within the outer periphery of the at least one of the first and second vehicle rolling means.

9. The vehicle in accordance with claim 1, wherein:
at least one of the first and second driving means comprises an electric motor comprising a rotor and a stator and that
the vehicle further comprises an accelerometer that measures acceleration of at least one of the first and second vehicle rolling means, the accelerometer being in signal communication with the stator.

10. The vehicle in accordance with claim 9, wherein the accelerometer comprises at least one of a piezoelectric sensor and an inductive sensor.

11. The vehicle in accordance with claim 1, wherein
the first vehicle rolling means comprises four first-direction-wheels having their direction of revolution in the first direction and
the second vehicle rolling means comprises four second-direction-wheels having their direction of revolution in the second direction,
wherein each of the first-direction-wheels and each of the second-direction-wheels is drivingly connected to the first driving means and the second driving means, respectively.

12. The vehicle in accordance with claim 11, wherein, for each wheel, at least part of the driving means is arranged within the wheels outer periphery.

13. The vehicle in accordance with claim 11, wherein each of the wheels has a plurality of rotor magnets arranged within the inner radial surface of the wheels outer periphery and a plurality of stator field windings arranged at least partly within the vehicle body.

14. The vehicle in accordance with claim 13, wherein the stator field windings are following the outer periphery of the wheels.

15. A storage system for storage of bins, the storage system comprising:
a bin storing structure comprising a plurality of storage columns, wherein
each storage columns is arranged to accommodate a vertical stack of storage bins, and
a remotely operated vehicle in accordance with claim 1 arranged on top of the bin storing structure.

* * * * *

(12) INTER PARTES REVIEW CERTIFICATE (2972nd)
United States Patent
Hognaland

(10) Number: US 10,474,140 K1
(45) Certificate Issued: Jan. 18, 2023

(54) ROBOT FOR TRANSPORTING STORAGE BINS

(71) Applicant: Ingvar Hognaland

(72) Inventor: Ingvar Hognaland

(73) Assignee: AUTOSTORE TECHNOLOGY AS

Trial Number:

IPR2021-00311 filed Dec. 11, 2020

Inter Partes Review Certificate for:

Patent No.: 10,474,140
Issued: Nov. 12, 2019
Appl. No.: 15/546,851
Filed: Jul. 27, 2017

The results of IPR2021-00311 are reflected in this inter partes review certificate under 35 U.S.C. 318(b).

INTER PARTES REVIEW CERTIFICATE
U.S. Patent 10,474,140 K1
Trial No. IPR2021-00311
Certificate Issued Jan. 18, 2023

AS A RESULT OF THE INTER PARTES REVIEW PROCEEDING, IT HAS BEEN DETERMINED THAT:

Claims 1-4 and 11-15 are found patentable.

\* \* \* \* \*